UNITED STATES PATENT OFFICE.

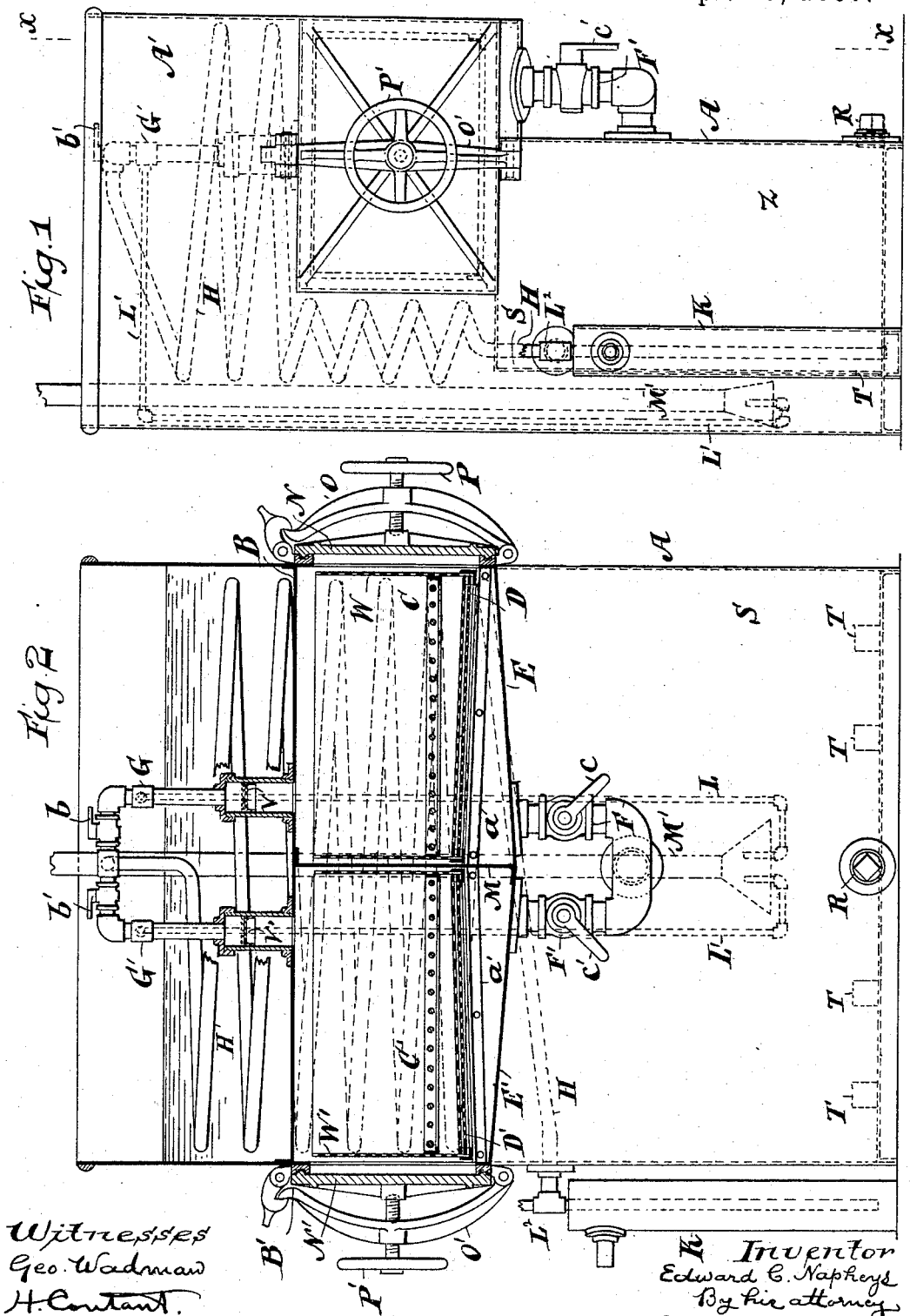

EDWARD C. NAPHEYS, OF PHILADELPHIA, PENNSYLVANIA, ASSIGNOR TO THE ELECTRO GAS COMPANY, OF WEST VIRGINIA.

ACETYLENE-GAS-GENERATING APPARATUS.

SPECIFICATION forming part of Letters Patent No. 580,624, dated April 13, 1897.

Application filed May 21, 1896. Serial No. 592,435. (No model.)

*To all whom it may concern:*

Be it known that I, EDWARD C. NAPHEYS, of the city of Philadelphia, State of Pennsylvania, have invented a new and useful Improvement in Gas-Generating Apparatus, of which the following is a full, true, and exact description, reference being had to the accompanying drawings.

This invention relates to a process for generating gas by the union of a solid and a liquid, and is especially applicable to the generation of acetylene gas by the union of calcium carbid and water.

This invention relates to that class of apparatus in which the carbid is supported in a chamber, preferably upon a grating, and the water is allowed to rise by its own gravity and come in contact with said carbid and be retired therefrom by the pressure of the gas generated by its contact.

My improvement especially relates to a mechanism which enables the ready supply of the carbid and withdrawal of the refuse material and which is compact and safe, being provided with safety appliances preventing any excess of pressure in the apparatus.

My apparatus is also of the duplex type, being provided with two independent generating-chambers capable of being cut off each from the other, as may be desired, so that one chamber can be in operation while the other is being charged.

My invention will be readily understood from the accompanying drawings, in which—

Figure 1 represents an end elevation, and Fig. 2 a vertical section through Fig. 1 on the line $x\, x$.

My apparatus consists generally of a water-tank capable of containing sufficient water to supply the necessary water for decomposition and the necessary height of water for maintaining the required pressure within the apparatus. In the form shown the tank has in its upper part a projection, as at A', Fig. 1, extending out over the lower portion of the tank A. In the upper extended portion of the tank A' are located the generating-chambers B B'. They are separated from each other by the partition M, and may be made of boiler-iron or other suitable material. They each contain removable baskets W W', which rest upon angle-irons $a$ when in position in the generating-chambers. The sides of the baskets W W' are preferably made of perforated metal and they contain a removable grating C C', upon which the carbid of calcium may rest when in position. The bottom of these baskets is preferably arranged with a double wire-netting, of which the lower has the finer mesh, the upper mesh being about eight to the inch and the lower about twenty-two to the inch. It is also to be observed that the bottom of these baskets is inclined toward the doors, whereas the bottoms of the generating-chambers E E' are inclined toward the center.

The generating-chambers B B' are closed by doors N N', suitably hinged, by preference, at the side, so that they can be swung out of the way of the basket. They are closed and forced into position by screws P P', mounted in pivoted locking-supports O, which when in position, as shown in Fig. 2, permit of a forcing of the doors into tight contact with their seats.

The upper parts of the generating-chambers are provided with outlets G G', which may be provided with sieves—as, for instance, felt sieves V V'—to prevent the lime from escaping through the outlet-pipes. These outlet-pipes G G', provided with suitable cocks $b\, b'$, unite in the condensing-coil H, which is extended through the large water-chamber above the generating-chambers, and afterward in smaller returns in the narrower space between the generating-chambers and the side of the tank. Thence the coil H passes through the side of the tank, as shown in Fig. 2, and into the drip-tank K, which receives any water which may be condensed in the tank and from which it may overflow, as desired. The outlet $L^2$, connected with the coil H, carries the gas to the place of consumption.

In the pipes G G', before they reach the cocks $b\, b'$, are connected the escape-pipes L L', which pass below the surface of the water and are then upturned into the bell-mouthed escape-pipe M', as is clearly shown in Fig. 2. In case of an excess of pressure within either of the generating-chambers the water normally standing in the pipes L L' will be forced down and the gas will thence escape through the pipe M', where it can be led to a place of safety.

The water connections with the generating-chambers B B' are shown as pipes F F', provided with cocks c c'. They are connected at the lowest part of the bottoms E E' and thence connect with the tank A below the generating-chambers, as is clearly shown in the drawings. This tank A is provided with a partition S, which extends down to approximately the bottom of the apparatus or quite to the same, where it is provided with water-openings T T T T, connecting with the upper portion of the tank A', thereby maintaining equilibrium of water between the two portions of the tank. The chamber Z serves as a gas-tank, as will be hereinafter described.

The operation of my apparatus will now be readily understood.

The apparatus being assumed to be empty of water, carbid is placed in the baskets. They are then placed in position and the doors are firmly closed. Then if it is desired to operate both baskets simultaneously the cocks b b' c c' are opened and water is placed in the tank, filling it to about the level shown in Fig. 2. The water rising through the pipes F F' enters the generator and attacks the carbid, thereby generating a gas. The air within the apparatus may be first allowed to escape through any suitable escape-pipe, and then the apparatus will function automatically, an excess of pressure driving down the water and causing it to pass from the chamber Z to the main chamber of the tank. If the generation should continue, the chamber Z will become gradually filled with gas, causing a corresponding rising of the water in the exterior chamber.

It will be observed that the construction of this apparatus has a tendency to drain practically all of the water from the carbid. The gas escaping to the point of consumption is dried in the condenser, which is in the same water used in the generating-chamber. When the pressure is sufficiently reduced, the water again passes in the chambers, and, as will be seen, on account of the inclination of the angle-irons $a$ $a'$, it enters first the lower corner of the baskets. The carbid as it is attacked by the water is changed to lime, which then falls through the grating and lies on the bottom of the basket, from whence it can be removed when the basket is withdrawn from the apparatus.

In case it is desired to operate but one generating-chamber the water and gas cocks of the other are closed—as, for instance, the cocks b c. When it is desired to cleanse and replenish one of the baskets, it is simply necessary to close its cocks, say the cocks b' c', open the door and replenish it. During this period the other generator supplies the needs of the apparatus.

It will be observed that the large body of water surrounding the generating-chamber and existing above it prevents the excessive heating of this chamber, which is one of the difficulties to be obviated in this class of apparatus.

What I claim as my invention, and desire to secure by Letters Patent, is—

1. In a gas-generator, a removable basket provided with grate-bars, and with one or more perforated nettings of fine mesh located under said grate-bars, for the purpose of arresting the material falling through said grate-bars, substantially as described.

2. In a gas-generator, the combination of two water-tanks communicating at their lower ends, a generating-chamber in one of said tanks provided with an outlet and a connection between said chamber and the upper part of the other water-tank normally permitting the flow of water in both directions, substantially as described.

3. The combination in a gas-generator, consisting of a water-tank and a generating-chamber contained therein, of a safety device consisting of a pipe plunging beneath the surface of the water and then upturned into the open mouth of a delivery-pipe, substantially as described.

4. The combination in a gas-generator, of a water-tank containing and surrounding two generating-chambers, separately connected by valve connections with the water in the tank, and separately connected with the gas-delivery, whereby the water-level in said surrounding tank causes the same pressure of gas to exist in each of the chambers, with whichever one it may be connected, the said chambers being provided with openings for cleansing and replenishing the same, substantially as described.

5. The combination of the tank A, the generating-chamber B, and the condenser H, located in the tank A, and extending above said generating-chamber, and over the top thereof and then downward between the generating-chamber and the side of the tank, and thence to the gas-delivery, thereby utilizing practically the entire cubic contents of the water-tank as a condenser, substantially as described.

6. In a gas-generator, the combination with a water-tank, of a generating-chamber communicating therewith, said chamber being provided with an inclined bottom and an oppositely-inclined screen above said bottom, substantially as described.

7. The combination in a gas-generator, of the tank A, provided with extension A', in which the generating-chamber B is located, and with the partition S, forming the chamber Z, connecting only through its lower portion with the main water-supply of the tank, substantially as described.

8. In a gas-generator, the combination with a water-tank, of a generating-chamber communicating therewith, said chamber being provided with an inlet and with an outlet, and a felt filter within the outlet whereby all solid particles which may be mechanically carried by the gas are arrested, substantially as described.

In testimony whereof I have signed my name to this specification in the presence of two subscribing witnesses.

EDWARD C. NAPHEYS.

Witnesses:
JOHN RODGERS,
ARTHUR W. TOBEY.